United States Patent [19]

Ghose

[11] Patent Number: 4,829,590

[45] Date of Patent: May 9, 1989

[54] ADAPTIVE NOISE ABATEMENT SYSTEM

[75] Inventor: Rabindra N. Ghose, Los Angeles, Calif.

[73] Assignee: Technology Research International, Inc., Calabasas, Calif.

[21] Appl. No.: 818,363

[22] Filed: Jan. 13, 1986

[51] Int. Cl.$^4$ ............................................. H04B 15/00
[52] U.S. Cl. ...................................... 455/63; 455/67; 455/69; 381/71
[58] Field of Search ....................... 455/63, 67, 69, 50, 455/24; 381/71

[56] References Cited

U.S. PATENT DOCUMENTS

| | | | |
|---|---|---|---|
| 3,984,774 | 10/1976 | Dehart | 455/63 |
| 4,019,140 | 4/1977 | Swerdlow | 455/63 |
| 4,025,724 | 5/1977 | Davidson | 381/71 |
| 4,325,141 | 4/1982 | Ghose | 455/63 |
| 4,434,505 | 2/1984 | Gotleber | 455/63 |
| 4,562,589 | 12/1985 | Warnaka | 381/71 |
| 4,566,118 | 1/1986 | Chaplin | 381/71 |
| 4,596,033 | 6/1986 | Swinbanks | 381/71 |
| 4,689,821 | 8/1987 | Salikuddin | 381/71 |

OTHER PUBLICATIONS

Noise Neutralizer, Radio-Electronics, Apr. 1952, p. 52-53.

Primary Examiner—Michael A. Masinick
Attorney, Agent, or Firm—Rabindra N. Ghose

[57] ABSTRACT

Devices and methods for minimizing multifrequency acoustic or electromagnetic noise that is propagated from its source to a remote region where the noise is to be abated by adaptive means are described herein. The noise minimization is achieved by sampling a noise, synthesizing from this sample a counternoise, the source of which is close to the noise source, and allowing the counternoise to propagate toward said region such that the noise and counternoise cancel each other as they arrive at said region. A closed-loop control is used to adjust the amplitude and time delay, or phase in case of monochromatic noise, of the counternoise during the synthesis, until the residual noise at said region becomes zero. For closed-loop control, the residual noise is transmitted back to the counternoise source by a communication link so that it can be used for said synthesis of the counternoise. The closed-loop control maintains the noise null at said region, even when the distance between the noise and said region changes with time.

13 Claims, 3 Drawing Sheets

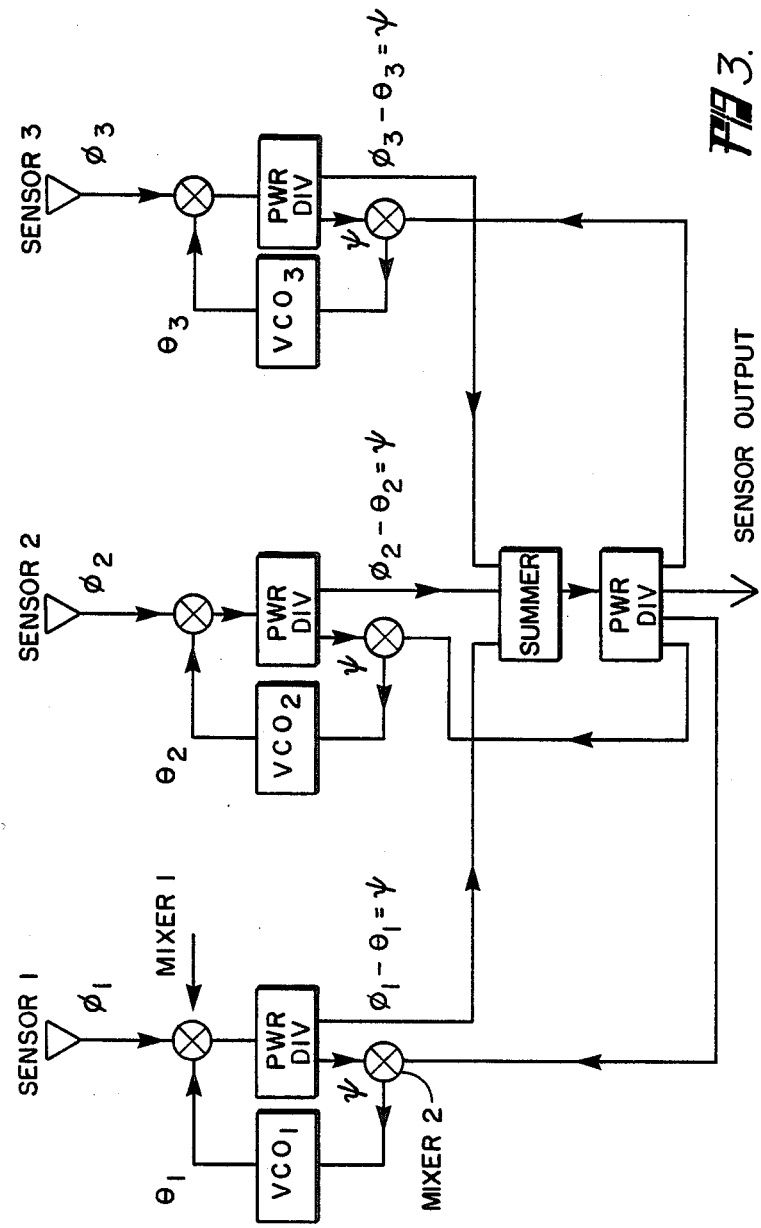

ADAPTIVE NOISE ABATEMENT SYSTEM

BACKGROUND OF THE INVENTION

The intense, but unwanted, electromagnetic or acoustic noise originating from a distant source could be disruptive to communications or could be an intolerable nuisance. The acoustic noise from a moving vehicle, such as large commercial aircrafts and helicopters, for example, can far exceed the reasonable, tolerable limit of noise, particularly at regions close to many airports. Often sources of such noise are unavoidable and means available to combat them are limited, if any. In the case of the noise due to an aircraft, the severity of the problem has compelled regulatory agencies in many areas to set upper bounds of maximum tolerable noise level permitted by an aircraft, and to enforce procedural means to reduce noise in communities close to major airports. This nuisance problem has led to an expansive research and development effort to design and build jet aircraft engines that produce less noise. Although a significant improvement in the aircraft noise reduction has resulted from this effort, the noise level still remains unacceptable and the corresponding nuisance remains unabated in many areas of the world. Since the aircraft noise reduction by better design of engines, exhaust fans, etc., is seemingly approaching a technological limit such that additional noise reduction is only feasible at the expense of performance degradation, complimentary technology and devices that can aid the noise abatement problem, are being sought by aircraft manufacturers, airlines, regulatory agencies and community managers, alike. One objective of the invention is to offer a remedy for further noise abatement in a specific region or regions of concern, beyond what is achievable by improved aircraft design.

A similar problem also arises for the electromagnetic noise where the existence of such noise can not be avoided, and conventional means available at the victim region to reduce the effect of interference, are either impractical or impossible to implement.

In many cases, the abatement of the noise becomes further involved because the noise source is a moving platform and the distance, and direction of the noise source with respect to the victim region are not precisely known to use a remedy which is not adaptive in character. If, however, a counter-noise can be created such that it always accompanies the noise of concern at the victim region, and if the noise and counter-noise at the victim region are equal in amplitude and 180° out-of-phase, then the ill-effects of the noise can be significantly reduced, if not eliminated. Since exact characteristics of the noise, such as its amplitude, phase and spectrum are always not a-priori known, an adaptive system is necessary to set and maintain the required counter-noise, amplitude, phase and spectrum such that the sum of the noise and counter-noise at the victim region of concern approaches a minimum. A cooperative sensor at the victim region, that can continuously monitor the sum of the noise and counter-noise at the victim region, and can provide means to control the amplitude and phase of the counter-noise so that the sum of the noise and counter-noise at the victim region approaches a minimum, could constitute a key element necessary for a closed-loop control of the counter-noise source that assures the noise reduction in a specific region, automatically.

In addition to an equal amplitude and 180° out-of-phase relationship between the noise and counter-noise, one needs to ensure that the waveforms of the noise and counter-noise are also identical at all times. This requirement, however, is readily achieved when the counter-noise is produced from a sample of the noise itself, so that its waveform is the same as that of the noise, except for a difference in amplitude and phase. Thus the key elements necessary to reduce the intensity of noise of acoustic or electromagnetic origin become a counter-noise source, a sensor and means to effect a change in amplitude and phase of the counter-noise, depending on the sensor output. The invention described herein utilizes these key elements in an integrated close-loop control system.

With reference to the prior art, an adaptive noise or interference cancellation system for a particular receiver, invented by Ghose and Sauter, has been in existence since 1969. Unlike the present invention, the invention of Ghose and Sauter relates to a radio communication system and is useful for minimizing or eliminating an interference in a particular radio receiver or a system located at a point. The invention of Ghose and Sauter, therefore, can not cure the problem of noise at any other point or receiver, even in close proximity of the receiver for which the noise minimization is intended. The fundamental difference between the invention of Ghose and Sauter and the present one is that in the present invention, the noise source is effectively neutralized by a counter-noise source in-so-far as a broad victim region, instead of a point or a particular receiver, is concerned. An element of the Ghose and Sauter invention, namely a pair of signal controllers responsive to the control signal for varying the amplitude and phase of the noise passing therethrough is however, utilized in the present invention.

Perhaps, in a broad sense, a phased array, where the amplitude and phase of different elements of the array can be varied to create a null in a specific direction, can be regarded as a relevant prior art. The fundamental difference between this prior art and the present invention is that, in the present invention a close-loop control, guided by an "in fact" noise minimum criterion at the intended victim region, is used to vary the amplitude and phase of the counter-noise, which, of course, is not present in a phased-array. The concept of counter-noise source is also absent in a phased array.

Other differences between relevant prior arts and the present invention will be apparent from the specifications, drawings, and claims that follow.

SUMMARY OF THE INVENTION

The inventive apparatus described herein comprises a source of counter-noise synthesized from a sample of the noise to be reduced, a sensor at the victim region where the noise is to be reduced, a communication link to transmit the sensor output to the location of the counter-noise source and a signal controller that can adjust the amplitude and phase of the counter-noise with the sensor output as a control signal, until the sensor output approaches a minimum. The generation of the counter-noise from a sample of the noise, assures an identical waveform or spectrum for the noise and counter-noise. The sensor at the victim region receives the noise and the counter-noise, and if the counter-noise is properly synthesized, the sensor output approaches a null or a minimum. If, however, the sensor output is not zero, it can be communicated to the location of the counternoise source and there it can be used as a control signal to change the amplitude and phase of the counter-noise until the sensor output approaches a null or a minimum. When the sensor output approaches a null, there is no noise at the victim region. If the noise and counter-noise sources are at a distance from the victim region, the waves radiating from the sources toward the victim region will be identical planewaves. Under this condition, if the sum of the noise and counter-noise is zero at any plane normal to the direction of propagation of the waves at the radiation zone, then the sum of the noise and counter-noise must be zero along any other plane normal to the direction of propagation at the far-field or radiation zone, including the victim region.

One advantage of the inventive apparatus is to effect a noise reduction by a close-loop control where the characteristics of the noise and the distance of the noise source from the victim region need not be known for the control of counter-noise to achieve a significant degree of noise reduction. Another advantage of the inventive apparatus is to maintain the noise reduction even in the presence of an irregular propagation medium between the noise and counter-noise sources and the victim region, since both noise and counter-noise travel through the same propagation medium.

Another advantage of the inventive apparatus is that it is independent of the system that produces the noise. Hence a high degree of noise reduction is achievable without affecting the system that produces the noise. This is particularly relevant for aircraft noise reduction where the inventive apparatus does not degrade aircraft performance while reducing noise generated therefrom.

Further objects and advantages of the invention will become apparent from the study of the following portion of the specifications, the claims, and the attached drawings.

BRIEF DESCRIPTION OF THE DRAWINGS

FIG. 3 is a layout of the adaptive sensor array that can automatically point its beam toward the direction of the noise and counter-noise sources.

DETAILED DESCRIPTION OF THE INVENTION

Figure 1:
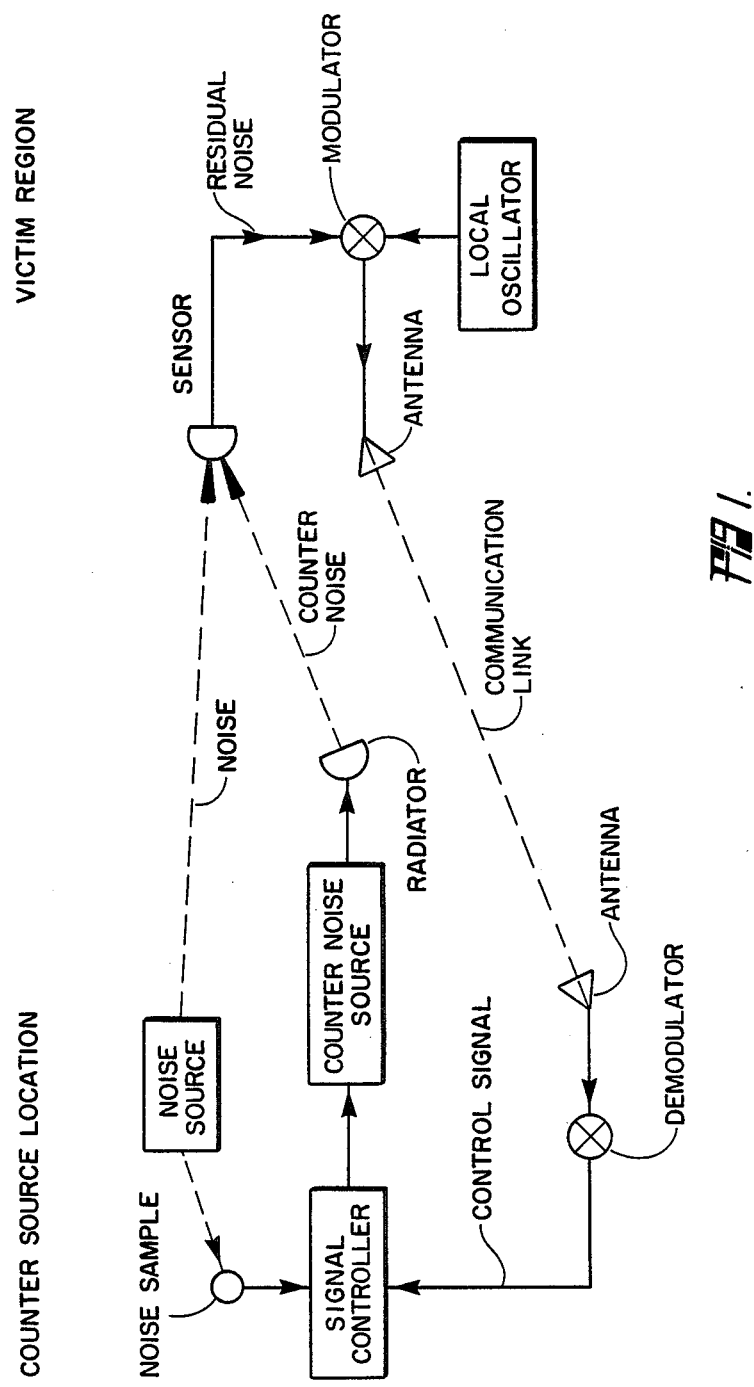
FIG. 1 is a simplified schematic arrangement of the adaptive noise abatement system.

FIG. 1 is a simplified schematic arrangement of the adaptive noise abatement system. As shown in this figure, the noise radiates from it source toward the victim region and is received by the sensor. A sample of the noise, having an identical waveform and spectrum of the noise, is used to synthesize the counter-noise by a signal controller, which causes a variation of amplitude and phase of the counter-noise with respect to those of the sampled noise. The counter-noise is also radiated toward the victim region by a radiator. The sensor output, then, constitutes the sum of the noise and counter-noise. The objective of the adaptive noise abatement system is to make the sensor output approach a null or a minimum, signifying a noise reduction not only at the sensor, but over a broad victim region around the sensor where the noise is to be minimized. This type of noise null has been experimentally verified in a field test employing the system embodiment as shown in FIG. 1. For the experiment, the counter-noise was synthesized directly from the source of noise by a signal controller which adjusted the amplitude and phase of a sample of the noise.

If the counter-noise is not properly synthesized the noise and the counter-noise will not cancel each other at the sensor, thereby leaving a residual noise. As shown in the figure, a radio frequency signal from a local oscillator is modulated with this residual noise and the modulated output is transmitted toward the sources of noise and counter-noise. At the location of the noise and counter-noise sources, the modulated signal transmitted from the victim region is received and demodulated to obtain a control signal which is proportional to the sensor output or residual noise at the victim region. This control signal is used to vary the amplitude and phase of the sampled noise passing through the signal controller constituting the counter-noise. The counter-noise source and radiator, the propagation link and the communication link including antennas, the demodulator and the signal controller, constitute a close-loop control system, the objective of which is to drive the control signal and hence, the residual noise at the output of the sensor at the victim region to zero, or a minimum, automatically.

Figure 2:
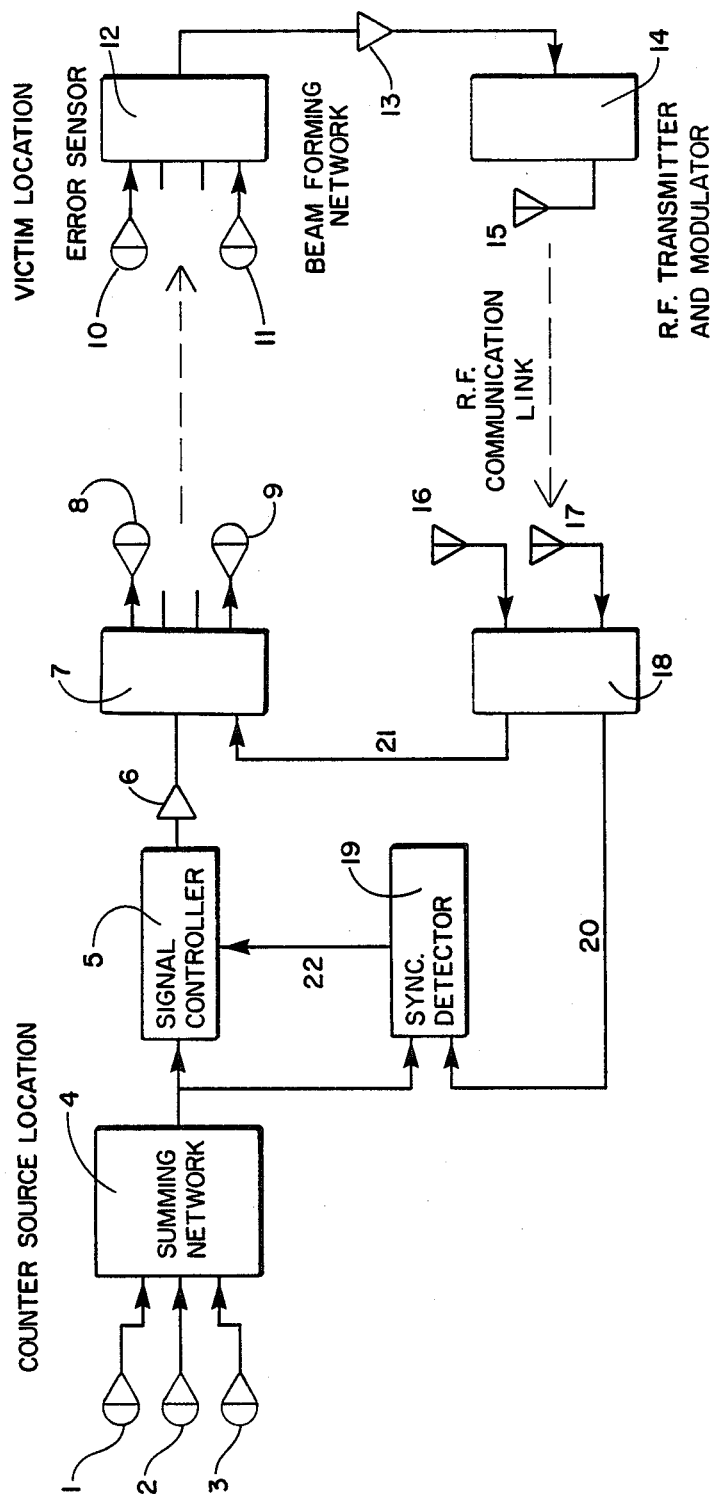
FIG. 2 is a detailed block diagram of the adaptive noise abatement system including its essential elements such as the counter-noise radiators, signal controller sensor, communication link and the close-loop control to adjust the amplitude and phase of the counter-noise.

FIG. 2 is a detailed block diagram of the adaptive noise abatement system, including its essential elements, such as, the counter-noise radiators, signal controller, sensor, the communication link and the close-loop control. As shown in the FIG. 1, 2, 3, etc., denote a plurality of sampling sensors with appropriate weighting factors to change gains and phases in sampling sensor lines used for the synthesis of the counter-noise. The output of summing network 4 provides the desired sample of the noise corresponding to the victim region. This sampled noise is adjusted in amplitude and phase at the signal controller, 5. The amplifier, 6, further amplifies the counter-noise level before it is radiated by the plurality of counter-noise radiators 8, 9, etc., toward the victim region automatically, with a control signal, 21, and weighting-factor-network 7. The functions of the network 7 and the control signal 21 are akin to those of a phased-array controlled by a signal to direct its equivalent beam to the desired direction.

At the victim region the noise and the counter-noise are received by an array of the sensors, 10, 11, etc. These sensors are also connected to a beam forming network 12, which permits the effective beam of the sensor to point toward the sources of noise and counter-noise. The output of the sensor is amplified in amplifier 13 and is modulated over a radio frequency signal at the transmitter 14. The modulated signal is radiated through the antenna 15 toward the sources of the counter-noise. The antennas 16 and 17, at the location of the source of counter-noise, receive the modulated signal transmitted from the victim region. The network 18 generates a control signal, 21, from the signal received from 16 and 17, for steering the counter-noise radiators 8, 9, etc., toward the victim region. The operation of antennas 16 and 17 and network 18 to generate control signal 21, is similar to an interferometer used for direction finding. The network 18 also provides a demodulated signal, 20, which is proportional to the sensor output 13. The demodulated signal is correlated with the input of the signal controller such that the correlator output is non-zero whenever the sensor output 13 is not zero. The control signal 22, derived from the correlator output, controls the amplitude and phase of the counter-noise passing through the signal controller 5, and thus closes the control loop. When, with proper adjustment of signal controller the counter-noise and the noise become identical in amplitude and 180° out-of-phase, the sensor output 13 and the corresponding close loop control signal 20 approach zero. For this condition the close-loop control attains an equilibrium and no further changes in amplitude and phase of the counter-noise is necessary. If, however, for any reason the counter-noise becomes different from what is required, the sensor output will again have a non-zero value. Consequently, the control signals 20 and 22 will effect further adjustments in amplitude and phase of the counter-noise until the sensor output becomes zero. This close-loop process, then, provides an automatic tracking for any irregularities that can affect the noise abatement system and maintains a high degree of noise cancellation at the victim region.

The array of sampling sensors with associated weighting factors shown in FIG. 2, instead of a single sensor, could be necessary to provide the required sampling of the noise corresponding to that at the victim region, particularly when the sampling sensors are located at the near-field of the noise source. Similarly, an array of counter-noise radiators 8, 9, etc., instead of a single radiator, may be necessary to obtain a directivity gain for the radiators. Such a gain is important, because less counter-noise power will be required for such a case to effect the noise abatement. The sensor array with sensors 10, 11, etc., provide a directivity gain for the sensor array for the direction of the noise and counter-noise sources. This directivity gain is desired to assure that the background or surrounding noise in the vicinity of the sensors at the victim region does not degrade the performance of the noise abatement system by wrongfully changing the sensor output and the corresponding control signals. Similarly, the antennas 16 and 17, and the associated network instead of a single antenna, enable the radiators for the counter-noise to point automatically toward the victim region.

The closed loop system, as illustrated in FIG. 2, then, could set and maintain a noise minimum over a broad victim region, automatically.

FIG. 3 is the layout of the adaptive sensor array that can automatically point its beam toward the direction of the noise and counter-noise sources, as already discussed. To illustrate an example, only three sensors are shown. Let a signal, originating from a distant source, be received by the three sensors with phases $\phi_1$, $\phi_2$ and $\phi_3$ as shown in the figure. The output of Mixer 1 in Sensor 1 circuit will have a phase of $\phi_1 - \theta_1$, where $\theta_1$ is the phase of the signal from the free-running $VCO_1$. The output of Mixer 2 of the same Sensor 1 circuit will be $\phi_1 - \theta_1 - \psi$, where $\psi$ is the phase of the signal common to each mixer corresponding to Mixer 2 in the three sensor circuits. For the equilibrium condition of each loop connected with each sensor circuit, one must have $\phi_1 - \theta_1 - \psi = 0$, $\phi_2 - \theta_2 - \psi = 0$ and $\phi_3 - \theta_3 - \psi = 0$. Thus at the output of the summer, the signal sensed by each sensor will be added in phase. Such a situation corresponds to the pointing of the main beam of the sensor array toward the direction of arrival of the signal. The arrangement of sensor array shown in FIG. 3, then, automatically points to the main beam.

The above described embodiments and methods are furnished as illustrations of the principles of this invention and are not intended to define the only embodiments possible in accordance with the teachings of the invention. Rather, protection under the U.S. Patent Law shall be afforded to the inventor not only to the specific embodiments above, but to those falling within the spirit and terms of the invention as defined in the following claims.

What is claimed is:

1. An adaptive system for the abatement of a multifrequency noise propagating in air from a source to a remote region where the noise is to be abated comprising:
   (a) a source from which the counternoise propagates in air;
   (b) a signal controller capable of adjusting the time delay and amplitude of said counternoise along with its polarity reversal;
   (c) a sensor located at (a) said region, where the noise is to be minimized, remote from said sources of noise and counternoise, such that the sensor output is proportional to the sum of said noise and counternoise received at said region, from the propagation link connecting the sensor to the counternoise source and the propagation link connecting the sensor to the noise source;
   (d) means for communicating said sensor output to said signal controller, through a communication link; and
   (e) an automatic closed-loop control means for effecting adjustments in amplitude and time delay of the counternoise by said signal controller.

2. An adaptive noise abatement system of claim 1, wherein said counter-noise is produced by adjusting the amplitude and phase of a sample of said noise as received at the counter-noise source.

3. An adaptive noise abatement system of claim 1, wherein said sensor output is communicated to the signal controller by a radio link.

4. An adaptive noise abatement system of claim 1, wherein the sources of noise and counter-noise are collocated.

5. An adaptive noise abatement system of claim 1, wherein said counternoise source, propagation link connecting the counternoise source and the sensor, the sensor, the communication link between the sensor and said signal controller, and means for adjusting the amplitude and time delay of the counternoise, constitute a close-loop control arrangement which sets and maintains a minimum value for the sensor output.

6. An adaptive noise abatement system of claim 1, wherein said signal controller comprises a hybrid that splits the input signal of the signal controller into a zero-degree path, having a zero-degree phase difference with respect to the input signal and a ninety-degree path, having a ninety-degree phase difference with respect to said input signal; two attenuators, one capable of attenuating the signal in the zero-degree path and the other capable of attenuating the signal in the ninety-degree path; and a summing device that adds the signals in the zero and ninety-degree paths following attenuations, such that the combined attenuations in said zero and ninety-degree paths constitute an amplitude and a phase change at the output of the summing device with respect to said input of the signal controller.

7. An adaptive noise abatement system of claim 1, further comprising a plurality of counter-noise sources arranged as an array to provide a directivity gain for the counter noise received at said region where said noise is to be minimized.

8. An adaptive noise abatement system of claim 1, wherein said sensor in the region where the noise is to be minimized comprises an array of sensor elements to provide a directivity gain for the sensor for receiving the counter-noise.

9. An adaptive noise abatement system of claim 8, wherein the array of sensor elements is adaptive to provide a directivity gain for the sensor toward the sources of noise and counter-noise automatically.

10. An adaptive noise abatement system of claim 1, wherein the noise is electromagnetic in character.

11. An adaptive noise abatement system of claim 1, wherein the noise is acoustic in character.

12. An adaptive noise abatement system of claim 1, wherein the noise is a multifrequency acoustical signal that is generated at a moving platform and is propagated in air from its source to the region where the noise is to be abated, the counternoise source is an acoustical transducer from which the counternoise, like the noise, propagates in air toward said region, and the sensor is a microphone located at said remote region, the propagation pathlengths from the sources of noise and counternoise to said region being variables with time.

13. A method for minimizing a multifrequency noise propagated to a remote region where the noise is to be minimized, from a distant source, by an adaptive noise abatement system which comprises:
 (a) Sampling of said noise;
 (b) controlling the amplitude and time delay of the sampled noise by a signal controller and reversing the polarity, and allowing this resultant counternoise to propagate toward said region;
 (c) receiving said counternoise along with the noise as they both propagate from their sources to said region by a sensor located at said region;
 (d) transmitting the sensor output to said signal controller located at the counternoise source through a communication link;
 (e) generating control signals in proportion to the sensor output for effecting said amplitude and time-delay changes by said signal controller; and
 (f) effecting adjustments in amplitude and time delay of said counternoise by said control signals until the sensor output approaches a minimum.

* * * * *